United States Patent [19]
Barks

[11] 3,916,585
[45] Nov. 4, 1975

[54] SINTERED ABRASIVE CONTAINING OXIDES FROM THE SYSTEM CERIA, ALUMINA, ZIRCONIA

[75] Inventor: Ronald E. Barks, Thompson, Conn.
[73] Assignee: Norton Company, Worcester, Mass.
[22] Filed: Oct. 24, 1973
[21] Appl. No.: 409,324

[52] U.S. Cl. .................... 51/309; 51/298; 106/57; 106/65
[51] Int. Cl.² ............................................ C09K 3/14
[58] Field of Search ........... 51/309, 298; 106/65, 57

[56] References Cited
UNITED STATES PATENTS

| | | | |
|---|---|---|---|
| 2,842,447 | 7/1958 | Schlotzhauer | 106/65 |
| 2,921,859 | 1/1960 | Godron | 106/57 |
| 3,454,385 | 7/1969 | Amero | 51/309 |

FOREIGN PATENTS OR APPLICATIONS

| | | | |
|---|---|---|---|
| 924,966 | 5/1963 | United Kingdom | 106/57 |
| 158,576 | 10/1971 | Hungary | 51/309 |

*Primary Examiner*—Donald J. Arnold
*Attorney, Agent, or Firm*—Rufus M. Franklin

[57] ABSTRACT

Compositions in the ceria, alumina, zirconia ternary composition diagram are prepared by sintering very finely divided powder mixtures which are preformed into abrasive grit sized particles prior to firing at 1350° to 1600°C. Very strong grits are obtained, highly resistant to impact, and having a low destructability factor in the rough grinding of metals such as stainless steel and carbon steels.

5 Claims, 1 Drawing Figure

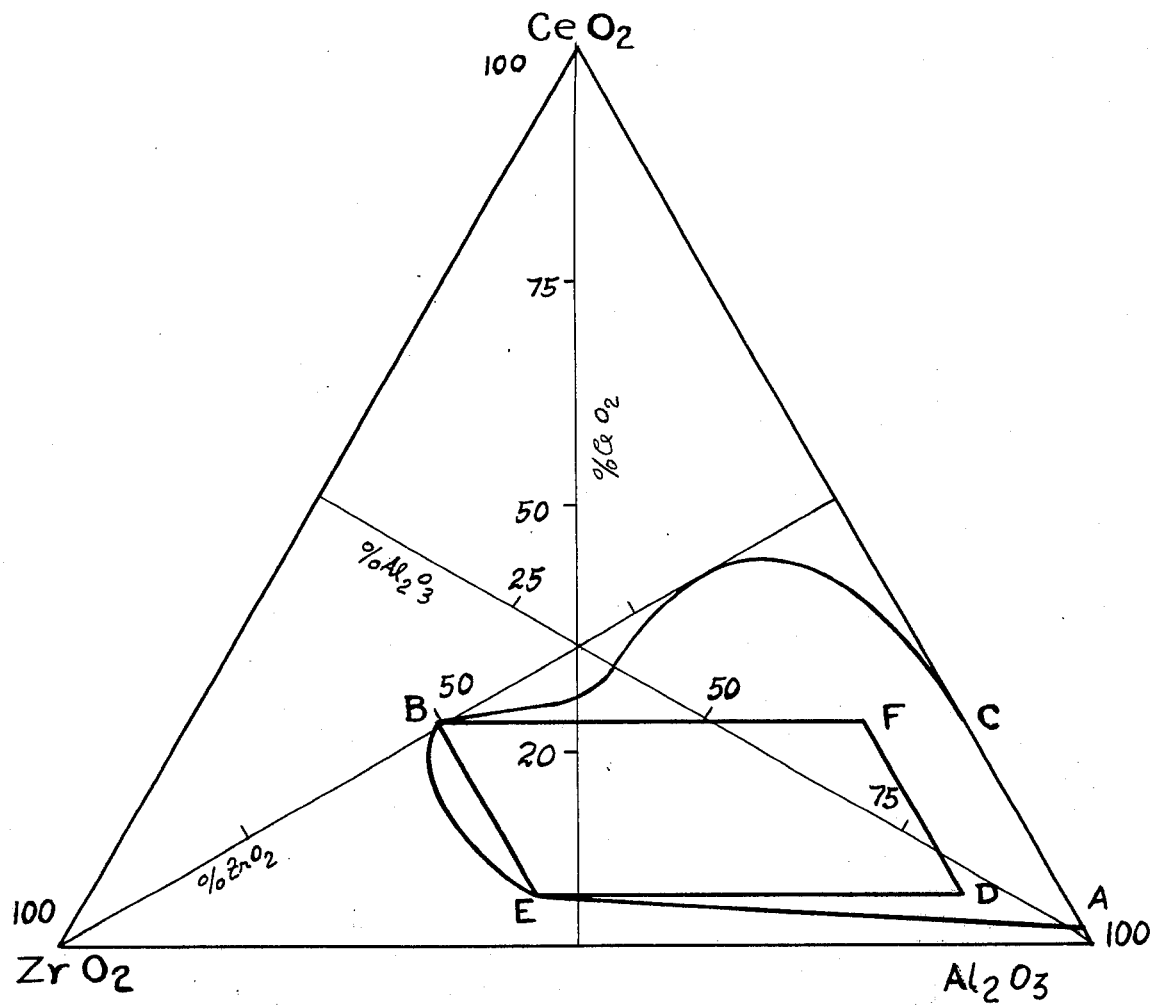

SINTERED ABRASIVE CONTAINING OXIDES FROM THE SYSTEM CERIA, ALUMINA, ZIRCONIA

BACKGROUND OF THE INVENTION

Sintered abrasives produced by heating finely divided bauxite or other aluminous compositions to sintering temperatures (between 1350° and 1600°C), as opposed to fused abrasives, produced by melting aluminous materials in an arc furnace at temperatures above 2000°C, have been commercial for about 13 years. They are described in U.S. Pat. Nos. 2,725,286; 3,079,243; 3,454,385; 3,387,957; 3,637,360; and 3,679,383; Japanese published application 68-4595 (published Feb. 20, 1968) discloses sintered aluminous abrasive grits containing 4 to 34% zirconia and 0.5 tc 4.5% manganese oxide. German published application 1,908,475, published Nov. 13, 1969, discloses sintered abrasives made from alumina mixed with zirconia and with from 1 to 10% of additives selected from the group of alkaline earth oxides and halides, chromium oxides, manganese oxides, cobalt oxides, and the halides of aluminum, manganese, cobalt, and chromium and mixtures thereof. Hungarian Patent 158576, published Oct. 30, 1971, although not relating to abrasives, discloses aluminous compositions containing alumina and zirconia with ceria, magnesia, and silica added. These compositions are sintered at temperatures above 1600°C to form products such as electrical insulators.

Sintered alumina-zirconia has recently been commercialized for use in snagging wheels.

It is an object of the present invention to provide a sintered aluminous abrasive of higher impact strength and attrition resistance equivalent or superior to previously known sintered abrasives.

The abrasive of this invention is a sintered aluminous or alumina-zirconia material containing from 2 to 25% of cerium oxide.

Although compositions containing substantial amounts of zirconia, between 10 and 45%, are preferred, it has been found that ceria-alumina products show excellent grinding properties, not previously recognized in the art.

DESCRIPTION OF THE DRAWING

The drawing is a ternary compositional diagram for the ceria, alumina, zirconia system, in which the area enclosed by the curve AEBC represents the compositions coming within the invention. The parallelogram DEBF represents the preferred limits of the invention.

Evaluation of abrasives for snagging grinding is a developing art. One measure of suitability of a particular abrasive is its friability. This property is measured by various different methods ranging from testing how easy it is to crush a given grit by hand between the jaws of a pair of pliers, to more sophisticated quantitative measures of the amount of break down which is achieved when a sample containing a large number of grits of the given material is subjected to attrition in a ball mill or by some other means. The method which we employ involves subjecting each grit particle in a large sample of grits of uniform size and shape to a single impact against a rapidly rotating steel paddle, and subjecting the particles resulting from the impact to a screen size analysis. Extensive testing in this manner over long periods of time has shown that brittle materials such as abrasives, when impacted in this manner break down in a manner described by the following equation:

$$R = \left(1 - \frac{x}{x_o}\right)^k ,$$

in which $R$ is the fraction by weight of the grain remaining on a given screen having openings of the dimension $x$; $x_o$ is the effective initial size of the grains (before impact), and $k$ is a dimensionless number which can be considered representative of the number of flaws in the material being tested. The lower the value of $k$, the stronger the material. The impact test method is discussed in Single Impact Testing of Brittle Materials by Karpinski and Tervo, at pages 126 to 130 of the June 1965 issue of Transactions of the Society of Mining Engineers.

In performing a determination of $k$ value a test sample is prepared from the crude abrasive by crushing and screening. The test sample comprises the part of the crushed abrasive that is retained between two specified adjacent screens in the Tyler series, after screening for one-half hour with a Tyler Ro-Tap sieve shaker (available from W. S. Tyler Co., Cleveland, Ohio). The sample weight is chosen to provide about 10,000 individual abrasive grits. For 14 grit, typically used for impact testing, a 100 gram sample is adequate.

The grains are dropped essentially one at a time, into an evacuated chamber (e.g. 2 mm Hg), in which they are struck in direct central impact by a mild steel vane that is moving at a predetermined velocity. The grain is driven by the impact into a collecting pot. Secondary impact is minimized by lining all the adjacent metal surfaces with gasket rubber.

The grain that has been collected in the pot is then screened for one-half hour on a nest of Tyler screens (adjacent sizes) in a Ro-Tap shaker to determine the post-impact size distribution in terms of weight of grain on each screen and on the pan. In the determinations of $k$ referred to herein, the paddle center was 12 inches radially from the center of rotation, and its speed was 2000 revolutions per minute, corresponding to a speed of 209 feet per second.

In an actual determination of a $k$ value, typically four screens would be used with a pan beneath them in the Ro-Tap machine. The first screen (arbitrarily denominated the "0" screen) is the screen upon which the test material was retained in the sizing operation. The succeeding screens, denominated 1, 2, 3, 4 etc. are each smaller than the preceding screen by the factor 1.189 (the fourth root of 2), in the Tyler screen system. This fact can be used to simplify calculations by preparing tables of values of the reciprocal of the logarithm of $$1 - \frac{x}{x_o}$$

for various values of $x_o$ (which normally will be between 1 and 1.5, when the 0 screen is arbitrarily assigned the value of 1 unit for its opening size).

The weights of grain on the several screens are recorded in order, starting with the 0 screen, and the cumulative fractions, $R$, of the total sample by weight on each screen are calculated. A value of $x_o$, say 1.02, is arbitrarily selected and from R for each screen, $k$ is calculated from the formula:

$$k = \frac{\log R}{\log \left(1 - \frac{x}{x_o}\right)}.$$

for each value of R. If the values of $k$ are the same for each R, then the correct $x_o$ has been chosen, and $k$ and $x_o$ are known. If the values of $k$ differ by more than one unit in the third decimal place, a new value of $x_o$ is chosen. This is repeated until $k$ is determined with the desired degree of accuracy.

Another measureable property of abrasive materials is the "destructability factor" or "$a$" value, defined by the equation $$M = KPV \frac{W}{W + a} \quad (1)$$

This equation represents the relationship, between wheel wear rate $W$, in cubic inches per hour, and material removal rate, $M$, in pounds per hour, where $P$ is the vertical force in pounds on the grinding wheel, $V$ is the surface speed of the wheel in feet per minute, $K$ is a constant which represents the grindability of the metal being ground, and $a$ is the before mentioned destructability factor having the units of cubic inches per hour. The equation represents the optimum metal removal rate for an abrasive of given value of $a$ for fixed pressure and wheel speed, at any given wheel wear rate W. In grinding tests it is convenient to calculate PV/M and 1/W from measurements of M and W. When plotted with PV/M on the Y axis and 1/W on the X axis, the result is a straight line passing through 1/K on the Y axis and whose slope is $a/K$. The K values for test metals may be known from previous tests or may be determined by obtaining grinding results for a given wheel with a known $a$ value or by measuring metal removal at more than one wheel wear rate (by varying speed, pressure, or hardness of the wheel bond) so that at least two points are determined to fix the straight line on the plot of PV/M vs. 1/W.

In the particular English and engineering units employed, the dimensions of the constant K are: 60 pounds per foot pound. Obviously any consistent units having consistent dimensions can be employed, in such case the numerical values of K and $a$ will of course be different from those employed herein. A theoretical discussion and derivation of equation (1) is given in the book: "Abrasives", by Loring Coes, Jr. published in 1971 by Springer-Verlag, Vienna and New York. In essence the equation states that the rate of metal removal is directly proportional to the energy applied to the wheel (PV) if there is no wear of the abrasive ($a = 0$). That is for the "perfect" abrasive, $M = KPV$. Since the value of $a$ is always some number larger than zero, the metal removal rate will, in fact, not be equal to KPV but will be reduced by an efficiency factor equal to W/(W + a). Thus, the smaller the value of $a$ the better potentially is the abrasive. The rate of metal removal given by equation (1) is that achieved when the abrasive is used at its optimum efficiency. If the bond is too soft or the abrasive too weak for the given grinding conditions, the metal removal rate will be less than that predicted by equation (1), and the abrasive will not perform at its true potential.

For example, an abrasive grit may fracture during grinding in such a way that it is not effectively utilized in the wheel. This may be because the abrasive is inherently too weak or is inadequately bonded for the particular grinding conditions, or it may be too splintery. That is, it may be of too weak a shape for the particular bond employed in the wheel.

Thus the inherent strength of the abrasive is an important property, which influences, along with the properties of the wheel bond and the destructability factor $a$, the wear rate (and the cutting rate) of a grinding wheel under a given set of grinding conditions. The dimensionless $k$ value, or impact strength, described above (not to be confused with the grindability, K, of a metal) is a measure of the strength of the abrasive grit. The particular value of $k$ for any given abrasive is dependent both upon the inherent strength of the material in resisting impact fracture, and the shape of the grit.

From the above it can be seen that for heavy duty grinding, such as snagging, where high speeds and forces are applied, the measureable properties of the abrasive which are important to performance are impact strength, $k$, and destructability factor, $a$. As pointed out by Coes, low destructability factors ($a$ values) are correlateable to high melting points for certain classes of abrasives.

The abrasives of the present invention are a class of sintered abrasive grits of novel composition, high strength, and low $a$ value, particularly suitable for use in organic bonded grinding wheels for heavy duty grinding, such as the snagging of steel billets.

The broadest compositional range of the sintered abrasive of this invention is bounded by the curve AEBC on the accompanying ternary composition diagram. The preferred composition for the abrasives of this invention is indicated by the area enclosed by the parallelogram DEBF. Although high purity raw materials are preferred, materials of over 98% purity are expensive. Up to 5%, total, by weight of impurities or sintering aids, such as oxides of iron, silicon, titanium, magnesium, calcium, chromium, cobalt, vanadium, nickel, and manganese can be tolerated or even preferred in the abrasive composition.

The preparation of the abrasive grits involves (1) mixing the raw materials, (2) forming the mixture into abrasive grit sized particles or shapes, and (3) drying and firing the preformed shaped grits.

The raw materials should be well mixed and in a finely divided condition, the particles of aluminum oxide, cerium oxide and zirconium oxide being between 0.5 and 10 microns in size or finer and should be 4 microns or finer in average size. The firing operation should not cause crystal growth above 5 microns, average size.

The patent literature cited above suggests several different forming methods which can be used with the compositions of this invention such as pressing into bricks which are then granulated into abrasive sized particles, extrusion, pouring into thin layers which are dried and then broken-up, molding etc. I prefer to prepare slurries containing deflocculents for use in casting into molds of the desired size, without any need for pressing, as when drier mixes are used. Suitable defloculents are ferric ammonium citrate, disclosed in Ueltz Pat. 2,637,360, or commercial deflocculents such as Darvan C or 7, sold by the R. T. Vanderbilt Company, New York.

Firing can be at temperatures of from 1350 to 1600°C, for from 1 to 24 hours.

The fired abrasive grain can be employed in resin bonded grinding wheels adapted for rotation at high surface speeds and high pressures.

EXAMPLES OF SPECIFIC EMBODIMENTS OF THE INVENTION

The starting materials in this example were ball milled Bayer process alumina (Alcoa A-14), Harshaw E220 zirconia, and Molycorp No. 535 cerium oxide. These powders, in the proportions, by weight, of 71.25% alumina, 23.75% zirconia, and 5.0% $CeO_2$, were dry mixed for one hour on a roll mixer, then wet milled in a vibratory mill until an average particle size between 2 and 3 microns was attained. The resultant slurry was then oven dried at approximately 95°C. The dried material was reduced to a powder by gentle rolling with a metal roller. The powder was pressed into cakes 3 inches in diameter using a pressure of 12 tons per square inch. No binder was present in the sample other than that water not removed during the drying cycle. The pressed cakes were passed through a Stoke's granulator. This granulated material was passed through 8 and 10 mesh screens. The green grain was tumbled in a fibre drum on a roll mixer in order to provide strong shaped grain using the following procedure. The +8 fraction of newly granulated material was tumbled for 5 to 10 minutes then resieved. Any +8 fraction remaining was hand passed through the 8 mesh screen. The entire +10 mesh fraction was then tumbled for ten minutes and resieved. The +10 fraction was then fired using a hot rod kiln to 1580°C in air with a hold time of 2 hours at this temperature. The fired grain was then separated into a strong shaped fraction and a weak shaped fraction using a Sutton table. X-ray diffraction analysis indicated the following crystalline phases were present: alpha aluminum oxide, tetragonal zirconia-ceria solid solution; monoclinic zirconia; cerium zirconate ($Ce_2Zr_2O_7$), the latter in barely detectable trace amounts.

Values of $k$ were determined using approximately 100 gm of material and speed of 2000 rpm (209 feet per second). The strong shaped fraction produced a $k$ value of 0.013, the weak shaped fraction a value of 0.050.

Another example is as follows:

Composition (same starting materials)

| Aluminum oxide | 67.5 Weight % |
| --- | --- |
| Zirconia | 22.5 Weight % |
| Cerium oxide | 10.0 Weight % |

This sample was treated in a manner identical to that previously cited. No monoclinic zirconium oxide was detected in the fired grain by X-ray diffraction. Value of $k$ obtained for the strong and weak shaped fractions of this sample were 0.046 and 0.107 respectively.

We have found that abrasives made with the proportions of zirconia, alumina and ceria, within the area ABCD in the ternary diagram have $k$ values (at 209 feet per second impact speed, and in 8 to 20 grit sizes) of 0.2 or less to as low as 0.01, and $a$ values lower than those obtained for sintered bauxite abrasive.

Instead of pressing and granulating the powder mixes we have found that molded to shape grains can be made by casting a slurry of the milled powders, with a deflocculent added to make a high solids but pourable mix, into molds of the desired grain shape. A convenient method for doing this is to use a perforated metal sheet clamped to a plaster of paris plate. The perforations are of the desired shape, and the plate of such thickness as to provide the desired geometry and size in the fired grit.

Illustrative of the mold casting method the following mix was prepared:

| Calcined Bayer process alumina (Alcoa A-14) | 89 pounds |
| --- | --- |
| $ZrO_2$ powder | 29.7 pounds |
| Ceria powder | 6.2 pounds |

The zirconia employed had a typical analysis of 98.6% zirconia plus hafnia, (about 3% hafnia) with the remainder being less than 1% each of lime, silica, titania, iron, and alumina. The mixed dry powders are reduced in particle size by wet or dry milling to an average size of 2 to 4 microns. A slurry is prepared by adding 200 parts of water and 25 parts of a commercial deflocculent (Darvan C, sold by R. T. Vanderbilt Co., New York) to each 850 parts of the dry powder mix. To reduce porosity in the molded products it is desireable to remove any air bubbles from the slurry by vacuum mixing or by straining or sieving the slurry.

The slurry is then poured into molds, corresponding to individual abrasive grits, dried, the grits then being removed from the molds and fired. Firing may take place at 1350°C for a long period such as 24 hours, or at 1580°C for 1 to 2 hours, or at some intermediate temperature for an intermediate time. Products made according to this invention have been fired in air in an electrically heated kiln, and have been fired in a gas kiln having an oxidizing atmosphere. The average crystal size in the fired product should be less than 5 microns.

Measurements of $k$ values of products of this invention, in the 8 to 12 grit range have shown the abrasive to have extremely high impact strength, comparing favorably with and commonly exceeding fused abrasives of high strength and with other sintered abrasives. Grinding tests on stainless steel and carbon steels have shown the material to have a lower destructability factor ($a$ value) than commercially available sintered abrasive materials.

What is claimed is:

1. A grinding wheel containing bonded abrasive grits which grits are produced by sintering of formed to size particles, said grinding wheel being adapted for rough grinding application such as snag grinding of stainless steel characterized in that the individual abrasive grits have a composition including alumina, ceria, and zirconia in the compositional amounts represented within the area defined by the boundary AEBC in the accompanying ternary composition diagram, the alumina, zirconia, and ceria amounting to at least 95 weight % of the composition.

2. A grinding wheel as in claim 1 containing abrasive grits in which the compositional amounts of zirconia, alumina, and ceria are included within the boundary DEBF in the accompanying ternary composition drawing.

3. A grinding wheel as in claim 1 in which the individual grits contain, in addition to alumina, zirconia and ceria, oxides of metals selected from the group consisting of silicon, titanium, iron, calcium, magnesium, manganese, vanadium, chromium, nickel, and cobalt.

4. A grinding wheel as in claim 1 containing abrasive grits in which the average crystal size is less than 5 microns.

5. A grinding wheel as in claim 1 containing abrasive grit having an impact strength, $k$ at 209 feet per second of less than 0.2 in the 8 grit size.

* * * * *